United States Patent [19]
McNay et al.

[11] Patent Number: 5,671,005
[45] Date of Patent: Sep. 23, 1997

[54] METHOD AND APPARATUS FOR MAINTAINING CONTACT BETWEEN THE RECORDING MEDIA AND MEDIA SUPPORT SURFACE OF A SCANNING SYSTEM

[75] Inventors: Robert P. McNay, Tewksbury; Donald J. Garand, Chelmsford, both of Mass.; Norris C. LeMay, Salem, N.H.; Robert D. Pepe, Dracut; David P. Viola, Andover, both of Mass.

[73] Assignee: AGFA Division, Bayer Corporation, Wilmington, Mass.

[21] Appl. No.: 393,104

[22] Filed: Feb. 21, 1995

[51] Int. Cl.⁶ .................................................. B41J 2/47
[52] U.S. Cl. .......................... 347/262; 347/264; 347/139
[58] Field of Search ............................... 347/262, 264, 347/139

[56] References Cited

U.S. PATENT DOCUMENTS

| | | | |
|---|---|---|---|
| 4,168,506 | 9/1979 | Corsover | 347/262 |
| 4,686,541 | 8/1987 | Rosier | 347/262 |
| 5,508,730 | 4/1996 | Klein | 347/262 |

*Primary Examiner*—Mark J. Reinhart
*Attorney, Agent, or Firm*—John A. Merecki

[57] ABSTRACT

A method and apparatus for maintaining contact between the recording media and the media support surface of a scanning system. A pressure load is applied on the recording media in the immediate vicinity of a scanning laser beam, thereby ensuring surface to surface contact between the recording media and the media support surface while scanning.

17 Claims, 6 Drawing Sheets

METHOD AND APPARATUS FOR MAINTAINING CONTACT BETWEEN THE RECORDING MEDIA AND MEDIA SUPPORT SURFACE OF A SCANNING SYSTEM

FIELD OF THE INVENTION

The present invention relates in general to scanning systems including, but not limited to, internal drum type laser imagesetters and flatbed scanners. More particularly, the present invention is directed to a method and apparatus for maintaining surface to surface contact between the media support surface of the scanning system and recording media disposed thereon. Media lifting and scalloping is substantially reduced by applying a pressure load on the recording media in the immediate vicinity of the scanning laser beam.

BACKGROUND OF THE INVENTION

In a typical internal drum type laser imagesetter, a section of a web of recording media is drawn from a supply roll and subsequently registered on the surface of a drum shaped media support surface. Thereafter, during a scanning procedure, an image scanning system directs a focused, modulated, scanning laser beam across the recording media, producing a series of exposed scan lines representing an image to be recorded.

As known in the art, the quality of the final printed image is greatly dependent upon the radial spot focus of the scanning laser beam during the scanning procedure. Accordingly, manufacturers have long attempted to optimize the radial spot focus of the scanning laser beam, with limited success, by increasing the degree of surface to surface contact between the media support surface and the recording media. Heretofore, for example, vacuum systems have commonly been utilized to draw the recording media against the media support surface, increasing surface to surface contact by creating a partial vacuum between the media and the media support surface.

Maintaining adequate surface to surface contact between the media support surface and the recording media using a vacuum system or the like has proven to be very difficult, especially in internal drum type laser imagesetters having a large imaging area, due to the inherent characteristics of roll-fed recording media; a section of the recording media may lift off the surface of the internal drum (hereinafter referred to as "lifting"), and/or the edges of the media may lift or curve away from the surface of the drum (hereinafter referred to as "scalloping"). In practice, sections of the recording media may extend 1 to 500 mil or more off the surface of the drum.

The problems of media lifting and scalloping are further exacerbated by the moisture sensitivity of the recording media commonly utilized in conjunction with internal drum type laser imagesetters. Specifically, if the operational humidity within the laser imagesetter is permitted to deviate from an optimal humidity level, the recording media may lift away from the surface of the drum as moisture is transferred between the recording media and the surrounding air. This is particularly a problem when the recording media remains for extended periods within the drum during idle (nonscanning) time.

The radial spot focus and associated spot size of the scanning laser beam are also dependent upon the effective thickness of the recording media (the distance between the surface of the internal drum and the outer surface of the recording media) across the surface of the drum. Specifically, the radial spot focus and spot size of the scanning laser beam are typically optimized according to a given media thickness and a desired image resolution. If the effective thickness of the recording media is allowed to vary across the surface of the drum due to the lifting or scalloping of the recording media, the radial spot focus and spot size may be adversely impacted, reducing the quality of the image recorded onto the media.

The quality of the recorded image may also be degraded if dust or other debris is present on the recording media. For example, many imagesetters include at least one media cutter which cuts the recording media into sheets after exposure. Occasionally, the cutting action of the media cutter(s) causes debris to fall into the drum where it may settle on top of an unexposed section of the recording media, potentially interfering with the scanning laser beam. Unfortunately, such interference may create "pinholes" in the final image.

Accordingly, it is a specific object of the present invention to improve the quality of a scanned image by maintaining and maximizing surface to surface contact between the recording media and the media support surface in the immediate vicinity of a scanning laser beam, thereby ensuring that the recording media is positioned within the optimal radial spot focus zone of the scanning laser beam.

It is a further object of the invention to prevent the recording media from lifting off the media support surface in the vicinity of the scanning laser beam.

It is another object of the invention to reduce scalloping at the edge portions of the recording media as the edge portions are scanned by the scanning laser beam during a scanning procedure.

It is yet another object of the present invention to provide an apparatus for cleaning a section of recording media immediately before the section of recording media is scanned by the scanning laser beam.

SUMMARY OF THE INVENTION

The present invention provides a method and apparatus for maintaining contact between the recording media and the media support surface of a scanning system. A mechanical or pneumatic pressure load is applied against the recording media in the immediate vicinity of the scanning laser beam, thereby ensuring surface to surface contact between the recording media and the media support surface while scanning. Advantageously, the deleterious effects of media lifting and scalloping on the radial spot focus of the scanning laser beam are substantially eliminated.

In a preferred embodiment of the instant invention, a plurality of retractable brush assemblies are utilized to compress the recording media against the drum surface of an internal drum type laser imagesetter. When the retractable brush assemblies are in an extended position, the bristles of each brush assembly compress the recording media against the surface of the drum, providing an "ironing" effect which smoothes out the recording media in the immediate vicinity of the scanning laser beam.

If necessary, the brush assemblies may be retracted to avoid scratching or otherwise damaging the surface of the recording media. For example, retraction of the brush assemblies may be required during media displacement as an unexposed area of the recording media is loaded into the internal drum. Other factors potentially necessitating the retraction of the brush assemblies may include the thickness of the recording media or the material characteristics of the recording media.

BRIEF DESCRIPTION OF THE DRAWINGS

The objects and features of the invention will best be understood from a detailed description of the invention and a preferred embodiment thereof selected for the purposes of illustration and shown in the accompanying drawings in which.

DETAILED DESCRIPTION OF THE INVENTION

Referring now specifically to the accompanying drawings, there are illustrated several embodiments of an apparatus for maintaining contact between the recording media and media support surface of an internal drum type laser imagesetter, wherein like reference numerals refer to like elements throughout the drawings.

Figure 1:
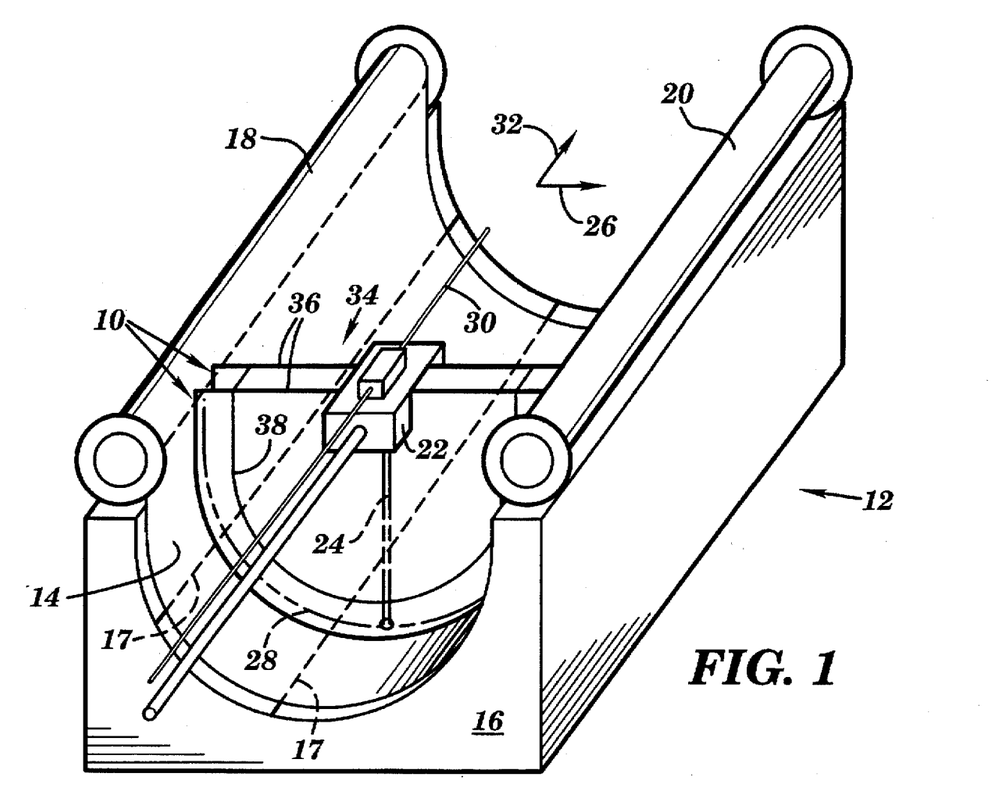
FIG. 1 is a simplified perspective view of an internal drum type laser imagesetter incorporating an apparatus for maintaining surface to surface contact between the recording media and the drum surface in the immediate vicinity of a scanning laser beam, in accordance with the general concept of the present invention.

A simplified illustration of a preferred embodiment of a contact maintaining apparatus, generally designated as 10, in accordance with a first embodiment of the present invention, is provided in FIG. 1. As shown, the apparatus 10 is incorporated in an internal drum type laser imagesetter 12, wherein a section of a web of recording media 14 is supported on an internal drum 16 during a scanning procedure. Of course, it should be readily apparent that the present invention may be utilized as necessary to maintain surface to surface contact between the recording media (or image to be scanned) and the support surface of other types of scanning systems without departing from the scope of the present invention. Such scanning systems may include, for example, external drum type imagesetters, flatbed scanners and the like.

As known in the art, a media transport and registration system (not shown for simplicity) is typically utilized to direct and secure a section of a web of the recording media 14, supplied via a supply roll 18, onto the drum 16 for scanning. After exposure, the recording media 14 may be rewound onto a take-up roll 20 for subsequent processing, or may be cut from the web and immediately developed using an on-line processor.

The laser imagesetter 12 further includes a scanning laser mechanism 22 for directing a focused, modulated scanning laser beam 24 onto the recording media 14, parallel to scan direction 26, exposing a scan line 28. A cross-scan transport mechanism 30, of a type commonly utilized in internal drum type laser imagesetters, displaces the scanning laser mechanism 22 longitudinally through the internal drum 16 at a constant cross-scan velocity along cross-scan direction 32. As depicted in FIG. 1, the cross-scan direction 32 is perpendicular to the scan direction 26. The scanning laser beam 24 is enclosed by a hollow shield, generally designated as 34, which serves as a protective light and air baffle. The hollow shield 34 includes a pair of opposing fan shaped members 36 which extend toward the surface of the drum 16 from the scanning laser mechanism 22, enclosing substantially the entire length of the scanning laser beam 24. Preferably, the distal rim portion 38 of each fan shaped member 36 is disposed a predetermined distance from the inner surface of the drum 16 to accommodate, as disclosed in greater detail hereinbelow, the contact maintaining apparatus 10 of the present invention. As the hollow shield 34 is displaced through the drum 16 along cross-scan direction 32 by the cross-scan transport mechanism 30, the contact maintaining apparatus 10 secured to the distal rim portion 38 of each fan shaped member forces the recording media 14 (or an image to be scanned) against the surface of the drum 16 in the immediate vicinity of the scanning laser beam.

If desired, the contact maintaining apparatus of the present invention may be utilized in conjunction with a vacuum arrangement to further force the recording media 14 against the surface of the drum 16. The vacuum arrangement generally utilizes a vacuum pump or other vacuum source (not shown) to evacuate air from a plurality of apertures or channels 17 in the surface of the drum 16. When the recording media 14 is positioned on the drum, a vacuum is generated in each channel 17 between the surface of the drum and the recording media in response to the actuation of the vacuum source, drawing the recording media against the surface of the drum.

As detailed above, a pair of contact maintaining apparatuses 10 are utilized to maintain surface to surface contact between the recording media 14 and the drum 16. However, it should be noted that a single contact maintaining apparatus 10, secured to the distal rim portion 38 of a single fan shaped member 36, may be utilized to increase surface to surface contact between the recording media 14 and the drum 16 proximate the scanning laser beam 24. Typically, however, a pair of contact maintaining apparatuses 10, positioned on opposing sides of the scanning laser beam 24, will provide a larger and more uniform area of surface to surface contact.

Figure 2:
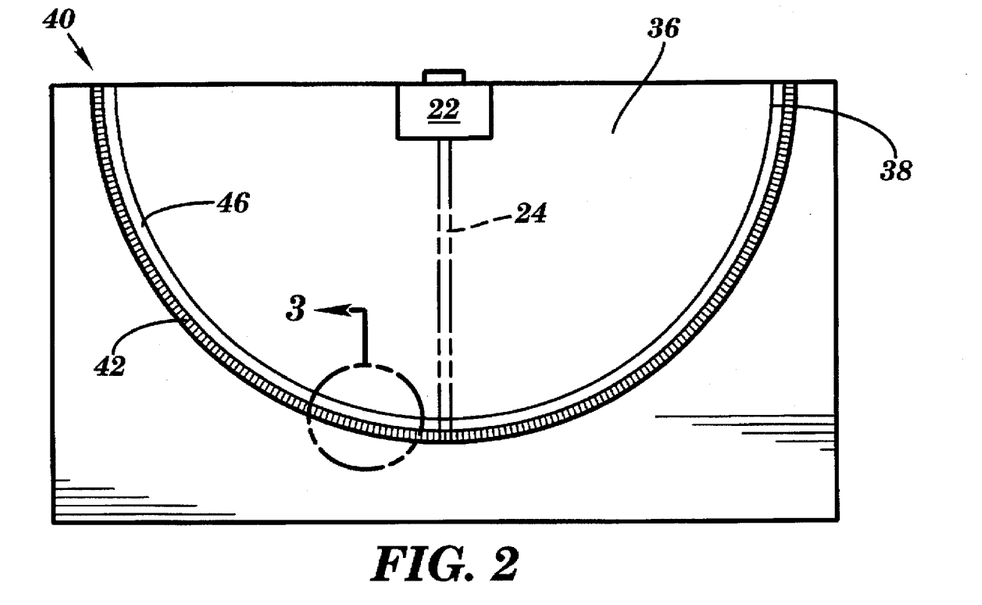
FIG. 2 illustrates a first embodiment of the contact maintaining apparatus in accordance with the present invention, wherein a pair of brush assemblies, each incorporating a single fixed brush, are utilized to maintain surface to surface contact between the recording media and the drum surface.
Figure 3:
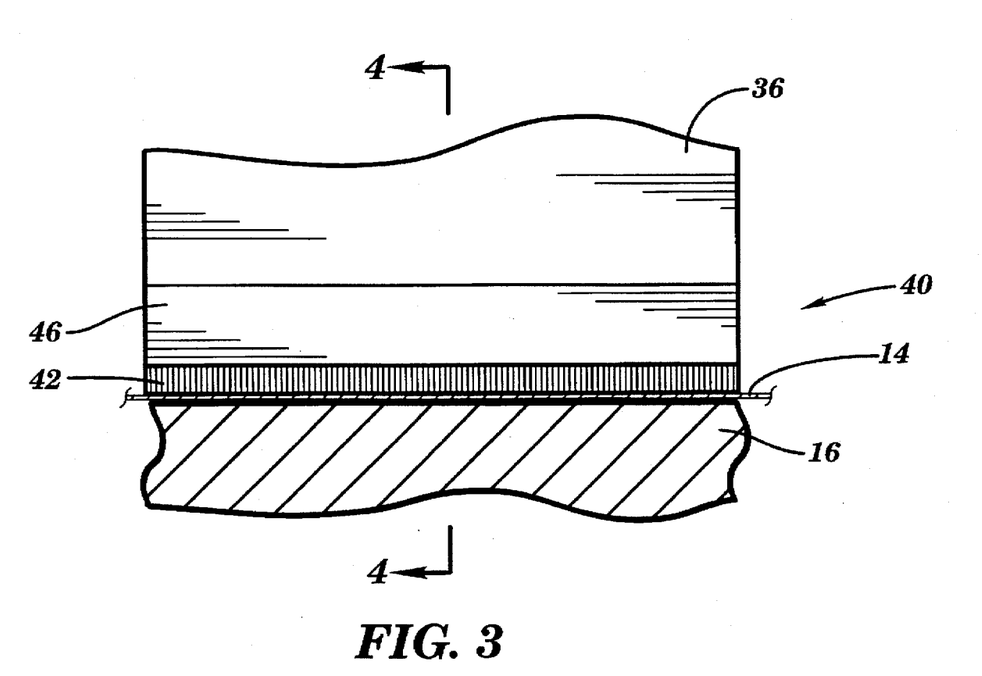
FIG. 3 is a partial, enlarged view of the contact maintaining apparatus illustrated in FIG. 2.

Referring now to FIGS. 2–3, there is illustrated a first embodiment of the contact maintaining apparatus 10 in accordance with the present invention, wherein a pair of brush assemblies 40, each comprising a single fixed brush member, are utilized to maintain surface to surface contact between the recording media 14 and the surface of the drum 16. A plurality of clamps or other suitable securing hardware (not shown) are employed to secure each brush assembly 40 to the distal rim portion 38 of an associated fan shaped members 36. Preferably, as illustrated in greater detail in FIG. 4, the brush assemblies 40 are secured as closely as possible to opposing sides of the scanning laser beam 24, thereby compressing the recording media 14 against the drum 16 immediately adjacent the laser beam 24.

Figure 4:
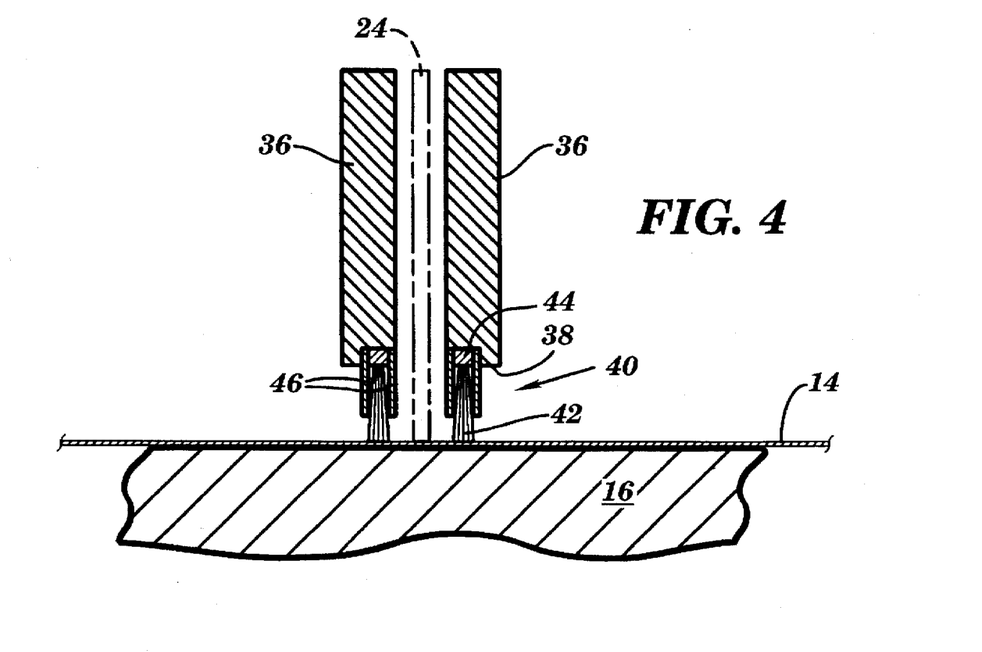
FIG. 4 is a partial cross-sectional view of the contact maintaining apparatus of FIG. 1, taken along line 4—4 of FIG. 3.

As shown in cross-section in FIG. 4, each brush assembly 40 generally includes a bristle section 42 imbedded within, and extending away from, a base portion 44. The bristle section 42 of each brush assembly 40 provides at least two important functions: compressing the recording media 14 against the surface of the drum 16 immediately adjacent the scanning laser beam 24; and, cleaning (sweeping) dust particles and the like off a section of the recording media immediately before that section of the recording media is scanned by the scanning laser beam. Referring again to FIG. 1, the sweeping action provided by the bristle sections of the brush assemblies is afforded by the displacement of the hollow shield 34 along the drum 16.

Although a wide variety of brush assemblies may be utilized in accordance with teachings of the present invention, the brush assemblies 40 are preferably anti-static in nature to facilitate dust removal from the static-prone surface of the recording media 14. One suitable brush assembly, available from Kinetronics of Sarasota, Fla., includes a blended conductive fiber brush which is fixed within a conductive polypropylene base portion.

The distal ends of the bristles forming the bristle section 42 of each brush assembly 40 have been designed to interfere (overlap) with the surface of the drum 16 to fully compress the recording media 14 against the surface of the drum. Generally, an interference of at least 1 mil has proven to be satisfactory for a wide range of media thicknesses and brush types. Of course, the degree of interference may vary according to the requirements of a specific application of the present invention.

As stated above, the brush assemblies 40 are preferably secured as closely as possible to the scanning laser beam 24. Unfortunately, depending upon such factors as the material characteristics of the brush assemblies, the cross-scan velocity of the brush assemblies over the surface of the recording media and the like, the bristles of one or both of the brush assemblies may, in some instances, physically interfere with the scanning laser beam, deleteriously affecting the quality of the scan. Accordingly, again referring to FIG. 4, one or more brush skirts 46 may be utilized to limit the lateral deformation of the bristles. Preferably, each brush skirt 46 is formed from a rigid material which is robust enough to constrain excessive lateral deformation and/or lateral displacement of the bristles.

Figure 5:
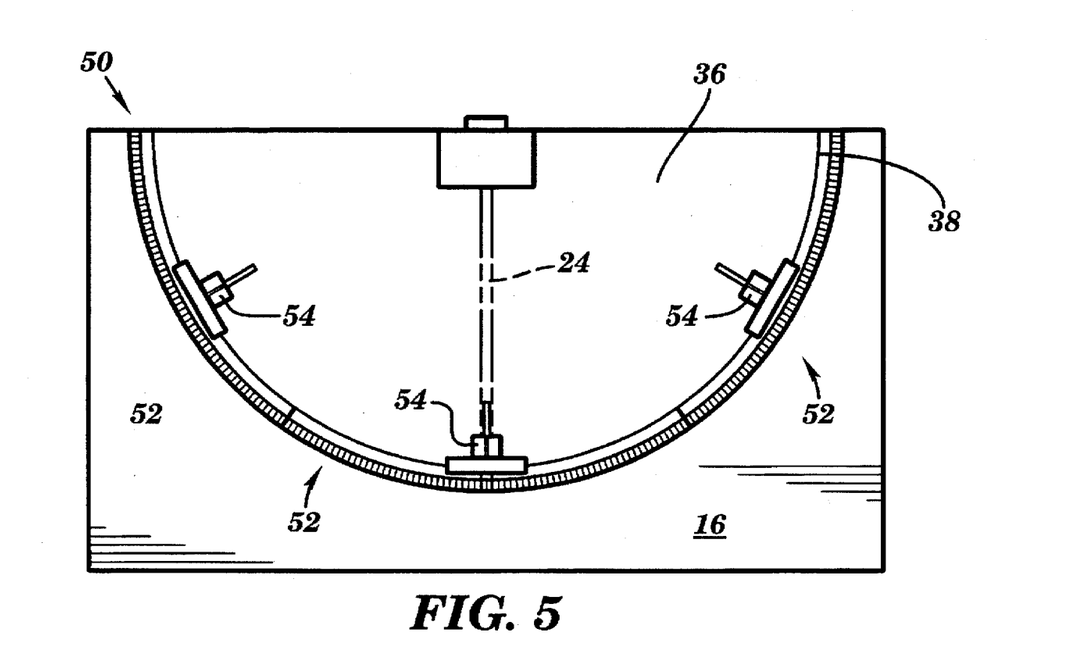
FIG. 5 illustrates a second, preferred embodiment of the present invention, wherein a plurality of retractable brush assemblies are utilized to maintain surface to surface contact between the recording media and the drum surface.

A second, preferred embodiment of a contact maintaining apparatus, generally designated as 50, is illustrated in FIG. 5. Specifically, the contact maintaining apparatus 50 includes at least one retractable brush assembly 52 and a corresponding number of brush retraction/extension systems 54 for retracting and extending some or all of the retractable brush assemblies 52 in response to predetermined criteria. Again, as in the first embodiment of the present invention, a contact maintaining apparatus 50 is suitably mounted to the distal rim portion 38 of at least one of the fan shaped members 36 forming the hollow shield 34.

In accordance with the second, preferred embodiment of the present invention, the plurality of retractable brush assemblies 52 are maintained in an extended position during a scanning procedure, applying a pressure load against the recording media in the immediate vicinity of the scanning laser beam. Occasionally, however, to avoid damaging the surface of the recording media, it may become necessary to remove the pressure load by retracting some or all of the plurality of retractable brush assemblies 52. Retraction may be required, for example, during the displacement of the recording media across the surface of the drum (e.g. during loading or unloading), or when utilizing recording media that is more susceptible to bristle damage.

Figure 6:
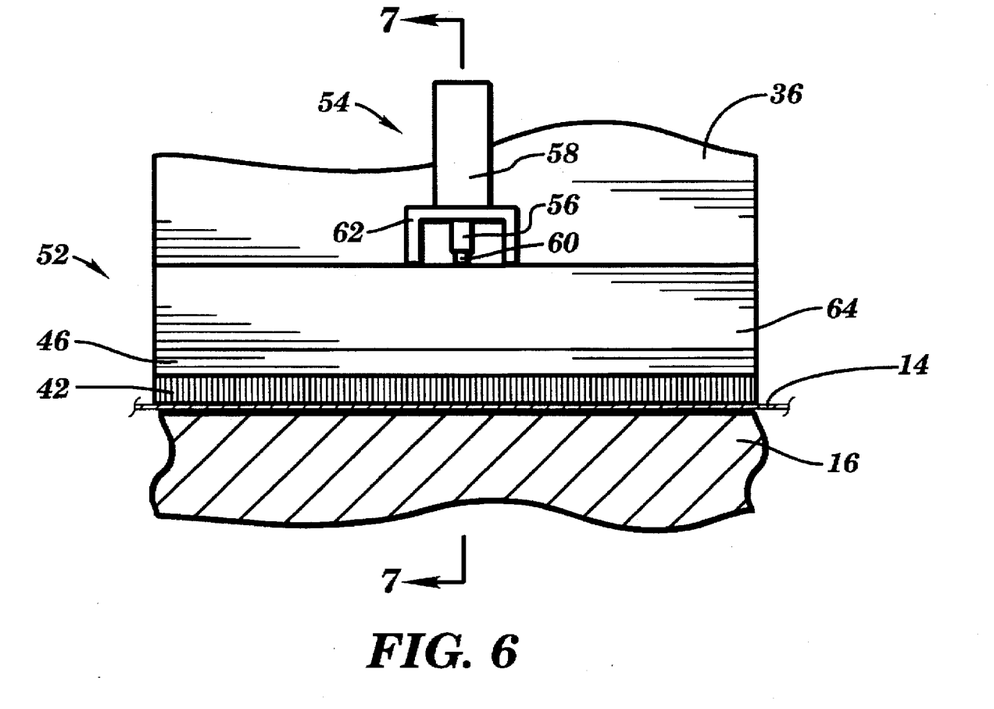
FIG. 6 provides a partial enlarged view of one of the retractable brush assemblies illustrated in FIG. 5.
Figure 7:
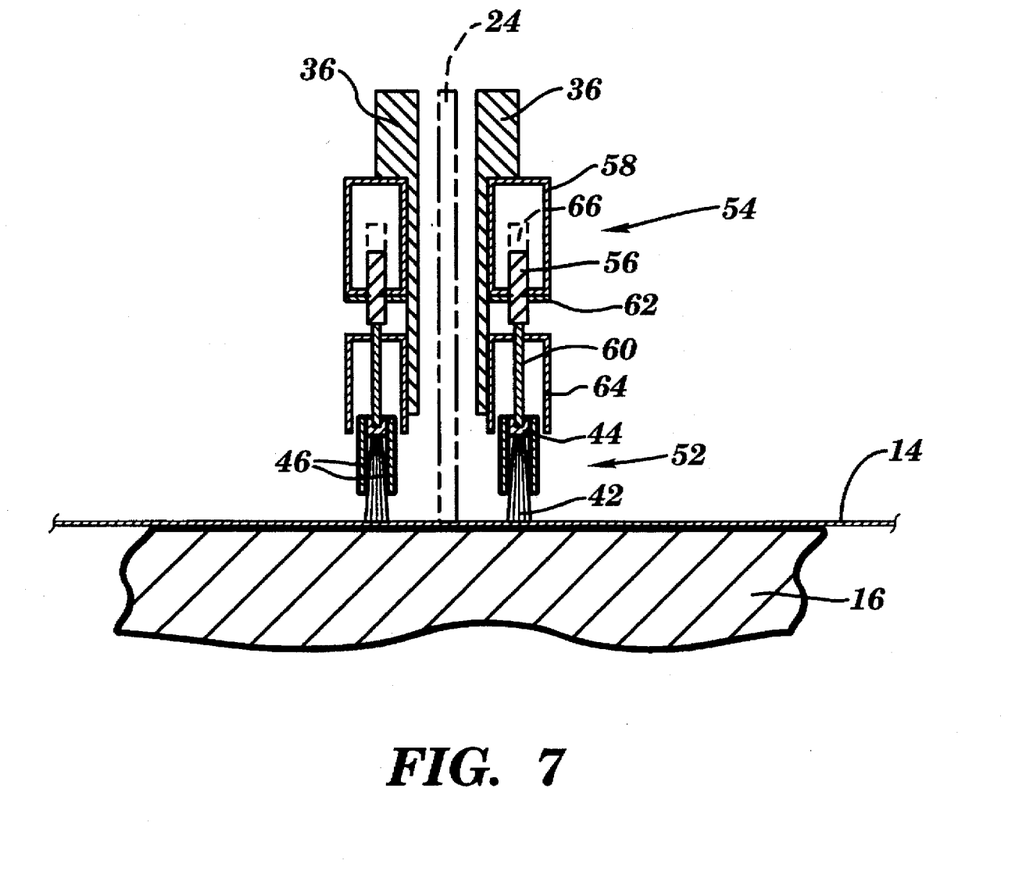
FIG. 7 is a cross-sectional view taken along line 7—7 of FIG. 6.

Referring now to FIGS. 6 and 7, each brush retraction/extension system 54 generally includes a displaceable piston (plunger) 56, extending out off, and controlled by, a piston actuator 58, and a shaft 60 for coupling the displaceable piston 56 to a retractable brush assembly 52. Each piston actuator 58 is supported above an associated retractable brush assembly 52 by a bracket 62, wherein the bracket 62 includes an aperture for slidably receiving the displaceable piston 56 therethrough. A housing 64, having an opening designed to accommodate the shaft 60, partially encloses the retractable brush assembly 52. Of course, any suitable securing hardware may be utilized to secure the brush retraction/extension systems 54 to the fan shaped members 36 of the hollow shield 34.

In FIG. 7, a pair of the plurality of retractable brush assemblies 52 are shown fully extended, with the bristle sections 42 of the assemblies compressing the recording media 14 against the surface of the drum 16. When the displaceable pistons 56 are retracted by respective piston actuators 58 as indicated by reference numeral 66, the bristle sections 42 of the retractable brush assemblies 52 are lifted off the surface of the recording media 14. As should be readily apparent to those skilled in the art, the retraction/extension of the retractable brush assemblies 52 may be initiated under manual control (e.g. push-button activation) or automatically in response to specific criteria. Such automatic control may easily be provided, for example, through the use of a suitably programmed processor. Further, each of the retractable brush assemblies 52 may be retracted and/or extended simultaneously or independently, depending upon specific operational requirements.

A wide variety of piston actuators 58 may be incorporated into the contact maintaining apparatus 50 of the present invention. Specifically, the piston actuators 58 may include solenoids, pneumatic cylinders or other systems capable of displacing the pistons 60 a predetermined distance during the extension and retraction of the brush assemblies 52. If the piston actuators 58 are not capable of independently limiting the extent of piston displacement, secondary displacement limiting systems (e.g. "stops") may be incorporated into the present invention to more accurately control the displacement of each brush assemblies 52.

Figure 8:
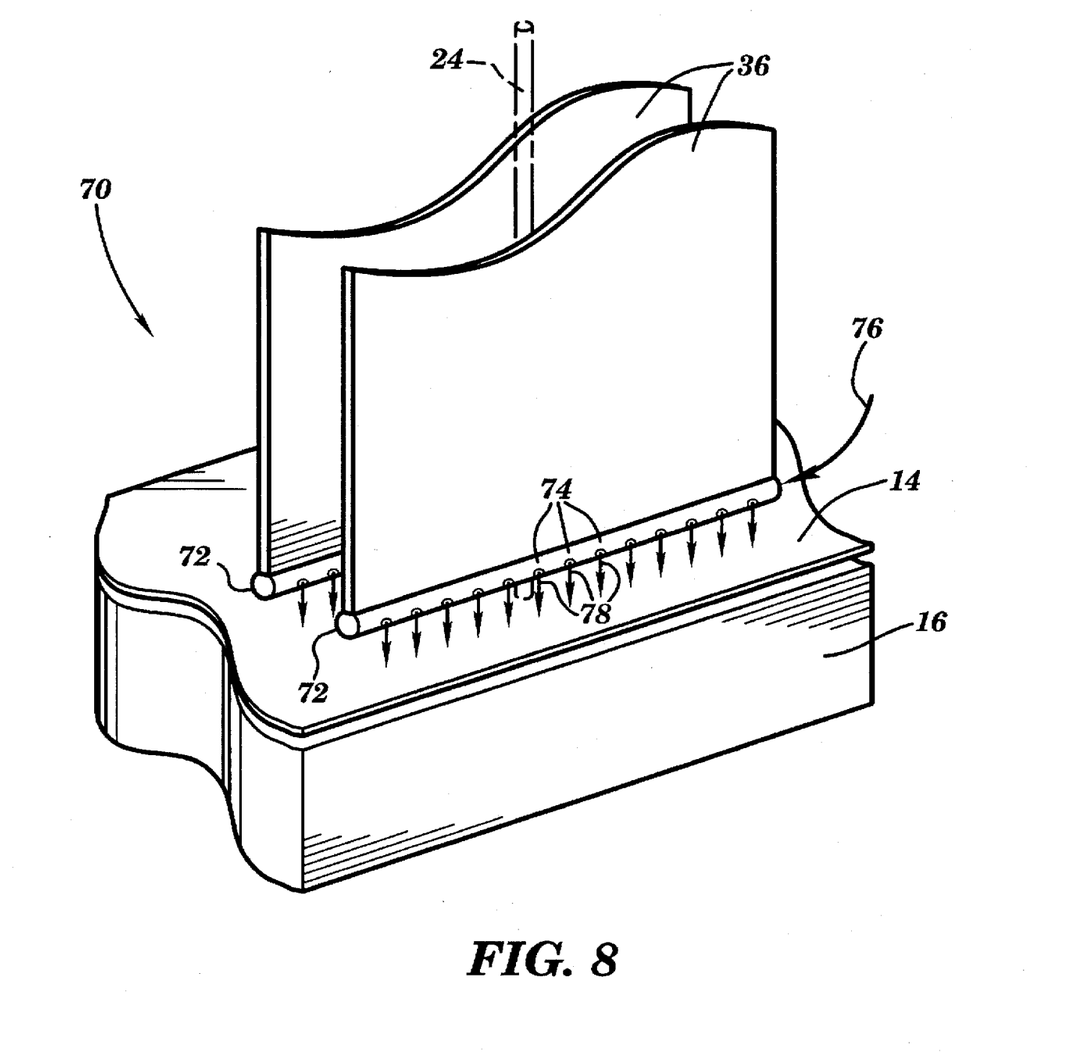
FIG. 8 illustrates yet another embodiment of the present invention, wherein a pneumatic system is utilized to compress the recording media against the surface of the internal drum.

A third embodiment of a contact maintaining apparatus 70, utilizing pressurized air to force the recording media 14 against the surface of the drum 16, is illustrated in FIG. 8. Specifically, surface to surface contact between the recording media 14 and the drum 16 in the immediate vicinity of the scanning laser beam 24 is maintaining by directing a supply of pressurized air against the recording media on at least one side of the scanning laser beam.

The contact maintaining apparatus 70 generally includes a perforated tube 72 which is mounted in any suitable manner to the distal rim portion 38 of at least one of the fan shaped members 36 forming the hollow shield 34. As shown, the bottom of each perforated tube 72 includes a series of apertures 74. When a supply of pressurized air 76 is introduced into a perforated tube 72, a plurality of air streams 78, each preferably oriented normal to the surface of the drum 16, exit through the apertures 74 and are directed against the surface of the recording media 14, forcing the media against the surface of the drum 16.

Figure 9:
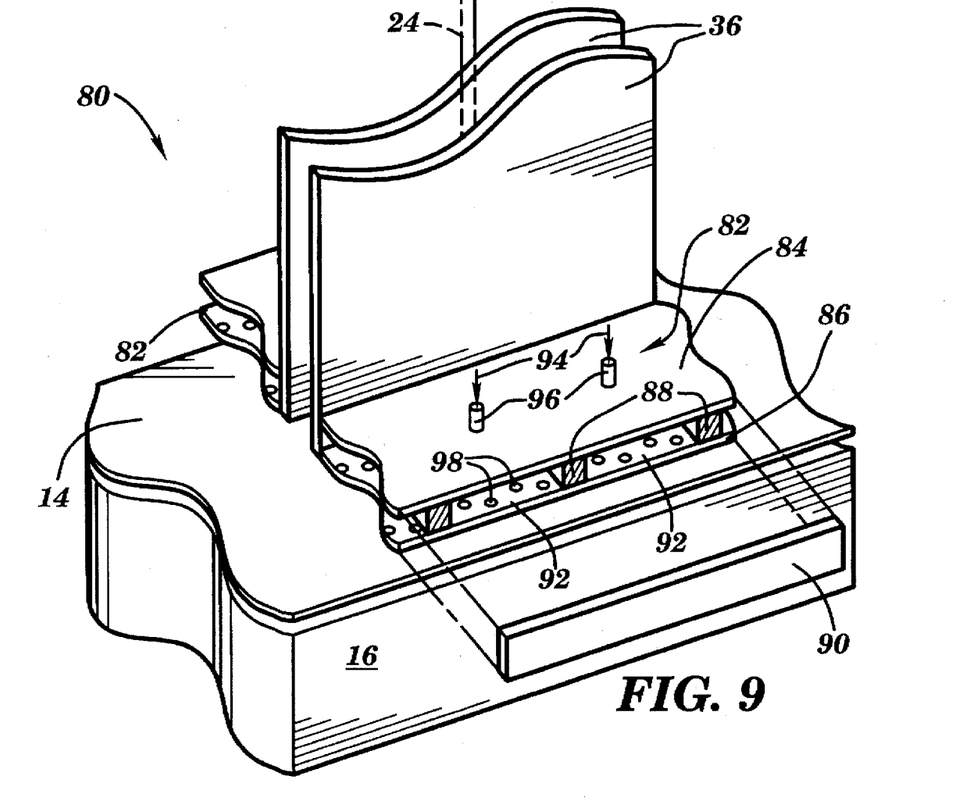
FIG. 9 illustrates a further embodiment of a pneumatic system for maintaining surface to surface contact between the recording media and the drum surface.
Figure 10:
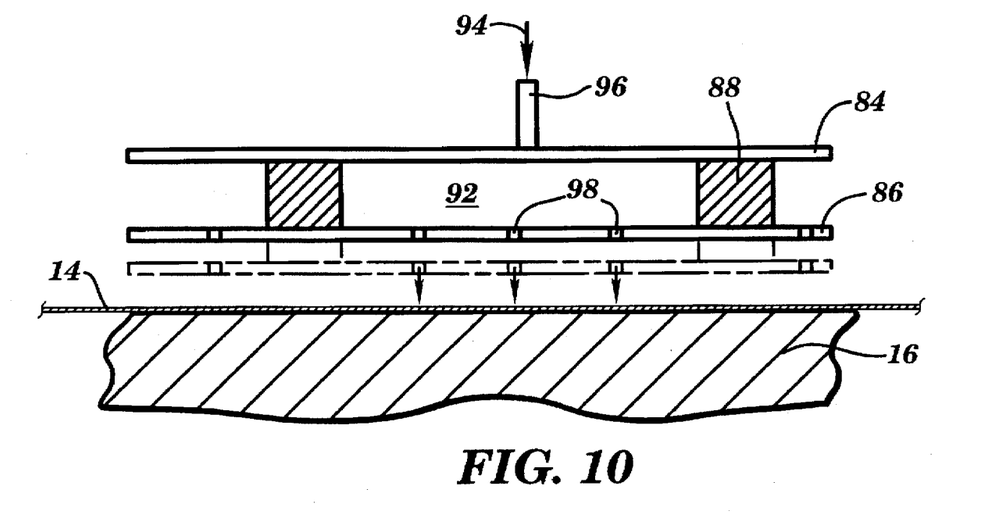
FIG. 10 is a partial enlarged view of the pneumatic system shown in FIG. 9.

A further embodiment of a pneumatic contact maintaining apparatus 80, wherein an air bearing 82 is utilized to force the recording media 14 against the surface of the drum 16, is shown in FIGS. 9 and 10. In operation, an air bearing 82 is fixed to the distal rim portion 38 of at least one of the fan shaped members 36 forming the hollow shield 34 to maintain surface to surface contact between the recording media 14 and the drum 16 immediately adjacent the scanning laser beam 24.

Each air bearing 82 generally includes upper and lower plates 84, 86 separated by a plurality of elastic spacers 88, preferably formed from a foam-type material. The upper and lower plates 84, 86 are suitably sealed, such as with end plate 90, forming a plurality of individual plenums 92. As indicated by arrows 94, pressurized air is injected into each plenum 92 via air inlets 96, escaping the plenum through a staggered arrangement of holes 98 formed in the lower plate 86. Advantageously, the air escaping through the holes 98 in the lower plate 86 of the air bearing 82 forces the recording media 14 against the surface of the drum 16, while simultaneously preventing the lower plate 86 from directly contacting the recording media 14.

The operation of each air bearing 82 is shown in greater detail in FIG. 10. Specifically, as indicated in phantom, the lower plate 86 is forced away from the upper plate 84, stretching the plurality of spacers 88, in response to the injection of pressurized air into each plenum 92 through a respective inlet 96. Displacement continues until the air pressure within the plenums 92 is balanced by the pressure of the air flowing between the lower plate 86 and the surface of the recording media 14. Preferably, under steady state conditions, the lower plate 86 is maintained (e.g. "floats") approximately 1 mil above the upper surface of the recording media 14.

Having described in detail a preferred embodiment of the present invention, it will now be apparent to those skilled in the art that numerous modifications can be made therein without departing from the scope of the invention as defined in the following claims. For example, other mechanical/pneumatic means such as a soft rubber molding, an inflatable ring seal or an adjustable sheet metal ring, each covered with a nonabrasive material such as plush, may be secured to at least one of the distal rim portions of the hollow shield as a contact maintaining apparatus. Additionally, other mechanical means such as a ring of ball casters, a ring of spherical rollers mounted onto a filament (similar to a string of pearls) and the like may be utilized to implement a contact maintaining apparatus in accordance with the general concept of the present invention.

We claim:

1. In an optical scanner including an internal drum and an optical arrangement for directing a scanning laser beam toward a quantity of recording media disposed on said internal drum, a method for maintaining contact between said internal drum and said recording media, comprising the steps of:

positioning said recording media on said internal drum; and, applying a mechanical pressure load against said recording media immediately adjacent said scanning laser beam, said pressure load forcing said recording media against said internal drum.

2. The method according to claim 1, wherein said step of applying a pressure load further includes the step of:

applying said pressure load against said recording media on opposing sides of said scanning laser beam, said pressure load forcing said recording media against said internal drum about said scanning laser beam.

3. The method according to claim 1, wherein said step of applying a pressure load further includes the step of:

removably applying said pressure load against said recording media.

4. The method according to claim 3, wherein said step of removably applying said pressure load further includes the steps of:

applying said pressure load when said recording media is stationary; and removing said pressure load during a displacement of said recording media.

5. The method according to claim 1, wherein said optical scanner further includes an apparatus for displacing said optical arrangement and said scanning beam along said internal drum, and wherein said step of applying a pressure load further includes the step of:

cleaning a section of said recording media adjacent said scanning beam immediately before said scanning beam contacts said section of recording media as said scanning beam is displaced along said internal drum.

6. The method according to claim 5, wherein said cleaning step further includes the step of:

sweeping a brush assembly over said recording media immediately before said scanning beam contacts said section of recording media.

7. An optical scanner including:

a support surface for supporting an element to be scanned;

an optical arrangement for directing a scanning laser beam toward the element supported on said support surface; and means for applying a mechanical pressure load against said element immediately adjacent said scanning laser beam, said pressure load forcing said element to be scanned against said support surface.

8. The optical scanner according to claim 7, further including:

means for displacing said optical arrangement along said support surface; and an arrangement for mounting said pressure applying means to said optical arrangement, wherein said pressure applying means is displaced along said support surface in response to a displacement of said optical arrangement.

9. The optical scanner according to claim 7, further including:

a hollow shield, coupled to said optical arrangement, for enclosing said scanning laser beam, said hollow shield further including a pair of opposing fan shaped members, each opposing fan shaped member having a distal end section disposed adjacent said support surface; and an arrangement for mounting said pressure applying means to the distal end section of said pair of opposing fan shaped members.

10. The optical scanner according to claim 7, wherein said pressure applying means includes at least one brush member for forcing said element to be scanned against said support surface.

11. The optical scanner according to claim 7, wherein said pressure applying means further includes:

means for retractably applying said pressure load against said element to be scanned.

12. The optical scanner according to claim 11, wherein said means for retractably applying said pressure load against said element to be scanned further includes:

means for applying said pressure load when said element to be scanned is stationary; and means for removing said pressure load during a displacement of said element to be scanned.

13. In an optical scanner including a media support surface, a supply of recording media positioned on said media support surface and an optical arrangement for directing a scanning laser beam toward said recording media, a method for maintaining contact between said media support surface and said recording media during a scanning operation, comprising the steps of:

positioning said recording media on said media support surface; and, applying a mechanical pressure load against said recording media immediately adjacent said scanning laser beam, said pressure load forcing said recording media against said media support surface.

14. The method according to claim 13, wherein said pressure applying step further includes the step of:

applying a pressure load against said recording media on opposing sides of said scanning laser beam, said pressure load forcing said recording media against said media support surface about said scanning laser beam.

15. The method according to claim 13, further including the step of:

drawing the recording media against the media support surface by applying a vacuum between said recording media and said media support surface.

16. The method according to claim 1, wherein said step of applying a pressure load includes the step of:

applying a brush assembly against said recording media immediately adjacent said scanning beam to force said recording media against said internal drum.

17. The method according to claim 13, wherein said step of applying a pressure load includes the step of:

applying a brush assembly against said recording media immediately adjacent said scanning beam to force said recording media against said media support surface.

* * * * *